(12) United States Patent
Gyoten et al.

(10) Patent No.: US 8,404,391 B2
(45) Date of Patent: Mar. 26, 2013

(54) METHOD OF OPERATING POLYMER ELECTROLYTE FUEL CELL

(75) Inventors: Hisaaki Gyoten, Osaka (JP); Masato Aizawa, Kyoto (JP); Akira Taomoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/359,248

(22) Filed: Jan. 26, 2012

(65) Prior Publication Data

US 2012/0189924 A1 Jul. 26, 2012

Related U.S. Application Data

(63) Continuation of application No. PCT/JP2010/003930, filed on Jun. 14, 2010.

(30) Foreign Application Priority Data

Aug. 26, 2009 (JP) ................................. 2009-194937

(51) Int. Cl.
*H01M 8/04* (2006.01)
*H01M 8/10* (2006.01)

(52) U.S. Cl. ........................................ 429/413; 429/483

(58) Field of Classification Search .................. 429/413, 429/482, 483
See application file for complete search history.

(56) References Cited

U.S. PATENT DOCUMENTS

| | | | | |
|---|---|---|---|---|
| 6,663,994 B1 * | 12/2003 | Fly et al. | ................... | 429/482 X |
| 6,835,488 B2 * | 12/2004 | Sasahara et al. | .............. | 429/482 |
| 7,691,518 B2 * | 4/2010 | Matsuoka | ..................... | 429/483 |
| 2006/0057448 A1 | 3/2006 | Miyauchi et al. | | |
| 2009/0173442 A1 | 7/2009 | Suzuki | | |

FOREIGN PATENT DOCUMENTS

| | | |
|---|---|---|
| JP | 2004-296176 | 10/2004 |
| JP | 2005-085544 | 3/2005 |
| JP | 2005-108822 | 4/2005 |
| JP | 2006-331720 | 12/2006 |
| JP | 2007-026836 | 2/2007 |
| JP | 2007-157572 | 6/2007 |
| JP | 2008-004486 | 1/2008 |

OTHER PUBLICATIONS

Computer-generated translation of Inoue et al. (JP 2004-296176), from the Japanese Patent Office website (doc date Oct. 2004).*
Computer-generated translation of Ando (JP 2007-157572), from the Japanese Patent Office website (doc date Jun. 2007).*
Zhilian Zhou et al., "Molded, High Surface Area Polymer Electrolyte Membranes from Cured Liquid Precursors," JACS Articles, 2006, vol. 128, pp. 12963-12972.
International Search Report issued in International Patent Application No. PCT/JP 2010/003930, mailed Sep. 7, 2010.

* cited by examiner

*Primary Examiner* — Stephen J. Kalafut
(74) *Attorney, Agent, or Firm* — McDermott Will & Emery LLP

(57) ABSTRACT

A polymer electrolyte fuel cell includes a cathode, an anode, and an electrolyte membrane sandwiched between the cathode and the anode. A plurality of projections each having a height of 5 to 15 μm or a plurality of depressions each having a depth of 5 to 15 μm are formed on a surface of the electrolyte membrane, the surface being opposed to the cathode. The cathode is constituted by a catalyst layer formed to tightly contact the surface of the electrolyte membrane and having a maximum thickness that is one to three times the height of the projection or the depth of the depression. An oxygen-containing gas having a relative humidity of 10% or less is supplied to the cathode, and electric power is generated by using the polymer electrolyte fuel cell.

1 Claim, 8 Drawing Sheets

PROJECTION TYPE

PROJECTION TYPE

DEPRESSION TYPE

METHOD OF OPERATING POLYMER ELECTROLYTE FUEL CELL

RELATED APPLICATIONS

This is a continuation application under 35 U.S.C. 111(a) of pending prior International application No. PCT/JP2010/003930, filed on Jun. 14, 2010 which in turn claims the benefit of Japanese Application No. 2009-194937, filed on Aug. 26, 2009, the disclosures of which Applications are incorporated by reference herein.

BACKGROUND OF THE INVENTION

1. Field of the Invention

The present invention relates to an electric power generating method of a polymer electrolyte fuel cell which can be used as an electric car power supply or a domestic power supply system and uses hydrogen or hydrocarbon, such as alcohol, as fuel.

2. Description of the Related Art

To improve the performance of a polymer electrolyte fuel cell, a method has been reported, in which: projections and depressions are formed on the surface of an electrolyte membrane to increase a contact area between a catalyst layer and the electrolyte membrane. Japanese Laid-Open Patent Application Publication No. 2005-108822 discloses a method in which a projection-depression structure is formed on the surface of the electrolyte membrane by pressing against the surface of the electrolyte membrane a shaping die (template) which is made of a material having higher hardness than the electrolyte membrane and has the projection-depression structure. Japanese Laid-Open Patent Application Publication No. 2006-331720 discloses a method in which the projection-depression structure is formed on the surface of the electrolyte membrane by: preforming the projection-depression structure on the surface of a base material film which also serves to protect the electrolyte membrane; applying a polymer membrane formation material on the base material film and drying the polymer membrane formation material; and peeling off the base material film from the electrolyte membrane.

J. Am. Chem. Soc., Vol. 128, No. 39, 12971 (2006) discloses a method of: pouring a precursor liquid of an electrolyte material, which hardens by ultraviolet, onto a template film made of polycyano methyl acrylate and having a surface subjected to microfabrication; hardening the precursor liquid by ultraviolet; and peeling off the film from the electrolyte membrane.

FIG. 3 of Japanese Laid-Open Patent Application Publication No. 2005-108822 shows a flow chart for explaining respective steps of forming minute protrusions on the surface of the electrolyte membrane. According to this method, by pressing an electrolyte membrane 201 placed on a metal stand 204 by using a shaping die 203 having predetermined depression shapes, columnar minute protrusions 104 are formed on the surface of the electrolyte membrane. Two types of shapes are disclosed as the shape of each of the minute protrusions (shown as pillars in the table of Japanese Laid-Open Patent Application Publication No. 2005-108822). To be specific, these are a so-called rod-shaped minute protrusion (Japanese Laid-Open Patent Application Publication No. 2005-108822, FIGS. 1 and 2) having a diameter of about 0.3 μm and a length of 3 μm and a disc-shaped minute protrusion (Japanese Laid-Open Patent Application Publication No. 2005-108822, FIGS. 5, 7, and 8) having a diameter of 0.5 to 5 μm and a length (height) of 0.25 to 2.6 μm.

Disclosed as a method of manufacturing a fuel cell having the rod-shaped minute protrusions is a method of: forming a char layer on the surfaces of the minute protrusions by heating at 100° C. for two minutes under a nitrogen atmosphere or by sputtering; and depositing metal catalysts, such as platinum, on the char layer. However, it is considered that the char layer cannot be formed under the above conditions. Therefore, Japanese Laid-Open Patent Application Publication No. 2005-108822 does not disclose a feasible manufacturing method. In addition, since specific or quantitative explanations regarding results of a performance evaluation are not disclosed at all, the effectiveness of the rod-shaped minute protrusion is unclear.

Disclosed as a method of manufacturing an electrolyte membrane having the disc-shaped minute protrusions is an example in which such electrolyte membrane is produced by pressing a depression-type shaping die against a sulfomethylated polyether sulfone membrane. However, the heights of the minute protrusions are 0.5 to 1 μm, and the diameters of the minute protrusions are up to 2.6 μm. In contrast, the thicknesses of the catalyst layers formed on the surfaces of the electrolyte membrane having the minute protrusions are significantly thick, that is, the catalyst layer on a cathode side is 160 μm and the catalyst layer on an anode side is 55 μm. The effect of the existence or non-existence of the disc-shaped minute protrusions and the effect of the shape of the protrusion have been evaluated by comparing output densities of cells. However, the improvement of the output density is small, that is, twice at most.

Claims of Japanese Laid-Open Patent Application Publication No. 2005-108822 recite the diameter and height of the minute protrusion, but these are just general numerical values which can be used when constituting a fuel cell. Relations with the thickness and shape of the catalyst layer in an actual membrane electrode assembly (MEA) are not described, and experimental methods and data for demonstrating the effect are not disclosed.

FIG. 2 of Japanese Laid-Open Patent Application Publication No. 2006-331720 shows a flow chart for explaining respective steps of forming a minute projection-depression structure on the surface of the electrolyte membrane by casting. According to this method, by pressing a protective sheet 3a (3b) by two rollers 10 and 11, minute protrusions 4a on the roller 10 are transferred onto the protective sheet. Next, the electrolyte membrane is formed by ejecting a hydrocarbon polymer membrane formation material 12 onto the protective sheet from a nozzle 13; uniformly spreading the hydrocarbon polymer membrane formation material 12 by a doctor blade 14; and drying the hydrocarbon polymer membrane formation material 12. However, the shape of the minute projection-depression structure on the electrolyte membrane disclosed in Japanese Laid-Open Patent Application Publication No. 2006-331720 is the same as that disclosed in Japanese Laid-Open Patent Application Publication No. 2005-108822. Further, electric power generation conditions, especially a humidification condition of a supply gas, are not adequately disclosed.

Japanese Laid-Open Patent Application Publication No. 2005-085544 discloses, as a method of forming the projections, a method of causing a particulate polymer electrolyte to adhere to a flat membrane and a method of melting a part of the flat membrane. In addition, Japanese Laid-Open Patent Application Publication No. 2005-085544 discloses the electric power generation performance when using an anode gas and a cathode gas each having a relative humidity of 26%. Japanese Laid-Open Patent Application Publication No. 2005-085544 describes that the fuel cell including the electrolyte membrane having the projections outputs high voltage under the same conditions. However, Japanese Laid-Open Patent Application Publication No. 2005-085544 does not suggest the relation between the shapes of the projections and a preferable humidification condition (especially, see Japanese Laid-Open Patent Application Publication No. 2005-085544, paragraphs 0020 and 0036).

J. Am. Chem. Soc., Vol. 128, No. 39, 12971 (2006) discloses that: minute insertion portions (depressions) arranged regularly and each having a size of 3 μm×3 μm are formed on the surface of the electrolyte membrane; and by gradually increasing the depth of each insertion portion to 1.4, 1.9, and 3.7 μm, the performance improves at the time of low current density but deteriorates at the time of high current density. However, J. Am. Chem. Soc., Vol. 128, No. 39, 12971 (2006) does not disclose the desirable shape of the minute structure on the surface of the electrolyte membrane and the humidification condition of the supply gas.

Another literature related to the present invention is Japanese Laid-Open Patent Application Publication No. 2008-004486.

Each of Japanese Laid-Open Patent Application Publication Nos. 2005-108822 and 2006-331720 and J. Am. Chem. Soc., Vol. 128, No. 39, 12971 (2006) discloses that the improvement effect of the output density can be obtained by forming the minute protrusions on the electrolyte membrane to increase the surface area. However, which one of various parameters regarding the shapes of the depressions and projections dominantly affects the performance of the fuel cell is not disclosed in each literature. In addition, the degree of improvement of the output density disclosed in each literature is low, and a large effect which can change the practical value of the fuel cell is not achieved.

The present invention was made in view of the above circumstances, and an object of the present invention is to provide an electric power generating method of causing a polymer electrolyte fuel cell including an electrolyte membrane having a depression-projection structure to achieve an excellent electric power generation performance.

SUMMARY OF THE INVENTION

The present inventors have studied the shapes of the projections and depressions on the electrolyte membrane having the depression-projection structure and specified a factor for dominantly improving the performance of the fuel cell. In addition, the present inventors have found that by decreasing the relative humidity of an oxygen-containing gas to be used, the polymer electrolyte fuel cell continuously, stably achieves excellent current-voltage characteristics. Thus, the present invention was made.

The present invention is as below.

A method of generating electric power using a polymer electrolyte fuel cell, includes: step (A) of preparing the polymer electrolyte fuel cell, wherein the polymer electrolyte fuel cell includes a cathode, an anode, and an electrolyte membrane sandwiched between the cathode and the anode, wherein a plurality of projections each having a height of 5 to 15 μm or a plurality of depressions each having a depth of 5 to 15 μm were formed on a surface of the electrolyte membrane, the surface being opposed to the cathode, and wherein the cathode is constituted by a catalyst layer formed to tightly contact the surface of the electrolyte membrane, and a thickness of the catalyst layer is one to three times the height of the projection or the depth of the depression; and step (B) of supplying an oxygen-containing gas having a relative humidity of 10% or less to the cathode to generate the electric power by using the polymer electrolyte fuel cell.

The above-described patent and non patent literature describe that the cell performance improvement effect by the formation of the projections and depressions on the surface of the membrane is obtained by, as a primary factor, the increase in the contact area between the electrolyte membrane and the catalyst layer and by, as a secondary factor, the proton bypass transport effect. As a result, the structures for increasing the surface area of the electrolyte membrane have been proposed regardless of the thickness of the catalyst layer. However, the present inventors have succeeded in obtaining data indicating that the proton bypass transport effect on the cathode side is the primary factor of the cell performance improvement. Based on this data, the configuration in which the height of the projection or the depth of the depression on the cathode-side surface of the electrolyte membrane is large, and the thickness of the catalyst layer on the cathode side is small is adopted such that the protons from the electrolyte membrane are easily supplied to portions of the catalyst layer, the portions being located far away from the electrolyte membrane and close to the gas diffusion layer.

However, according to this configuration, although the supply of the protons to the catalyst layer becomes easy, it becomes difficult to discharge the moisture generated by an electric reaction at the catalyst layer contacting the depressions of the electrolyte membrane (to be specific, at a deepest portion of the catalyst layer). The reactant gases are generally humidified such that the high electric power generation performance is obtained by the flat electrolyte membrane. In a case where the fuel cell is operated by supplying the humidified reactant gases to the electrolyte membrane including the depression-projection structure, the generated water condenses at the deepest portion of the catalyst layer and accumulates. Thus, the performance deteriorates with time during the electric power generation. The performance deterioration due to the accumulation of the water becomes significant during the operation at high current density. Therefore, according to the fuel cell in which the height of the projection or the depth of the depression on the cathode-side surface of the electrolyte membrane is large and the thickness of the catalyst layer on the cathode side is thin, by setting the relative humidity of the oxygen-containing gas supplied to the cathode side to 10% or less, the generated water or the condensed water does not accumulate, and the higher performance than before can be continuously achieved.

BRIEF DESCRIPTION OF THE DRAWINGS

In FIG. 2A, a humidification dew point of a supply gas is 90° C. (relative humidity is 100%). In FIG. 2B, the humidification dew point of the supply gas is 80° C. (relative humidity is 67%).

In FIG. 3A, the humidification dew point of the supply gas is 90° C. (relative humidity is 100%). In FIG. 3B, the humidification dew point of the supply gas is 80° C. (relative humidity is 67%).

In FIG. 4A, the humidification dew point of the supply gas is 90° C. (relative humidity is 100%). In FIG. 4B, the humidification dew point of the supply gas is 80° C. (relative humidity is 67%).

In FIG. 5A, the humidification dew point of the supply gas is 70° C. (relative humidity is 44%). In FIG. 5B, the humidification dew point of the supply gas is 40° C. (relative humidity is 10%). In FIG. 5C, the supply gas is not humidified (relative humidity is 3%).

DESCRIPTION OF THE PREFERRED EMBODIMENTS

Figure 1:
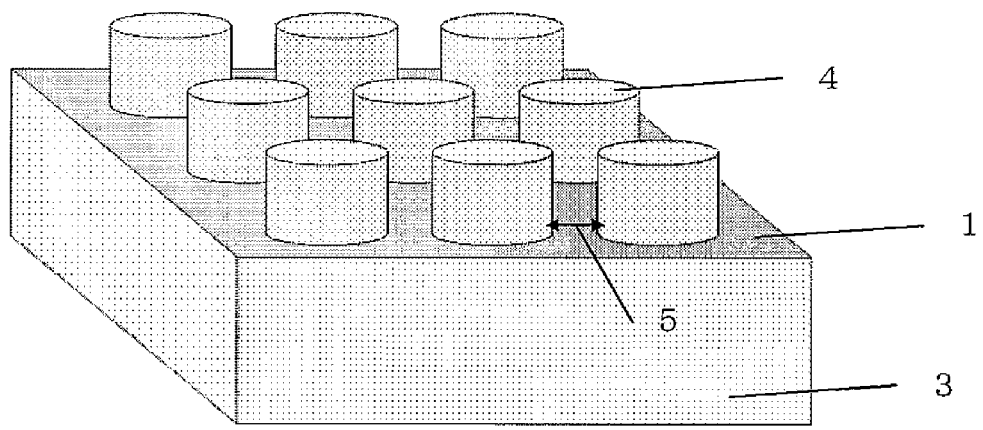
FIGS. 1A and 1B are conceptual diagrams each showing the shape of a cathode-side surface of an electrolyte membrane in Embodiment 1 of the present invention.
Figure 1:
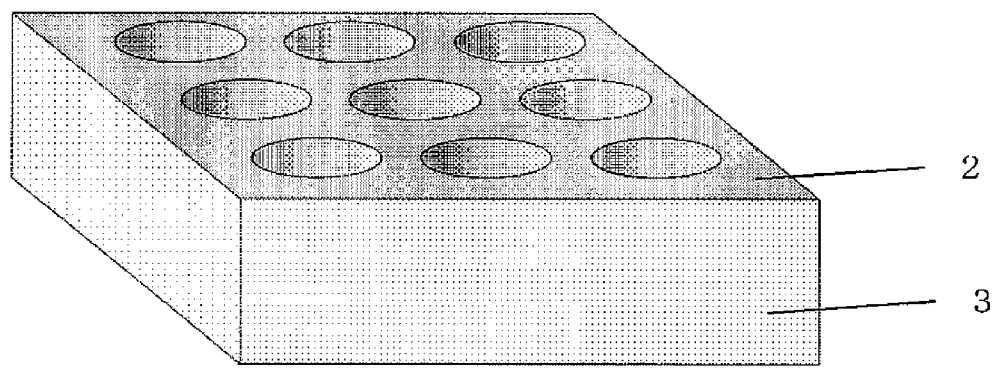

Hereinafter, embodiments of the present invention will be explained in reference to the drawings. As an example, the following will explain a method of generating electric power by supplying a hydrogen gas to an anode side of a fuel cell including, as an electrolyte membrane, Nafion (Product Name, produced by DuPont) made of fluoropolymer. However, the present invention is not limited to a case of utilizing the fuel cell including the polymer electrolyte made of fluoropolymer. The present invention is widely applicable to fuel cells including a gas diffusion electrode.

Embodiment 1

FIGS. 1A and 1B are conceptual diagrams each showing the surface of an electrolyte membrane 3 including a depression-projection structure in the present invention. As shown in FIG. 1A, a structure in which a flat lower base portion 1 is continuously formed and a plurality of discontinuous protrusions 4 (projections) are formed on the flat lower base portion 1 is called a projection type in the present invention. As shown in FIG. 1B, a structure in which a flat upper base portion 2 is continuously formed and a plurality of discontinuous holes (depressions) are formed on the flat upper base portion 2 is called a depression type in the present invention. FIGS. 1A and 1B show columnar projections and depressions as a representative example. However, the shape of each of the projections and depressions may be a polygonal column, such as a quadrangular prism or a triangular prism. In addition, the shape may be a cone or a pyramid. Various shapes are applicable to the projections and depressions. This depression-projection structure is formed on a cathode side, and a cathode catalyst layer is formed on a surface of the electrolyte membrane, the surface having the depression-projection structure. In the following embodiments of the present invention, the projection type will be mainly explained. However, the present invention is applicable to the depression type.

The area of a portion where the catalyst layer contacts the electrolyte membrane in each of the projection type and the depression type is larger than the area of a portion where the catalyst layer contacts a flat electrolyte membrane. This increase in the contact area can be expected to contribute to the improvement of the proton conductivity and adhesion between the catalyst layer and the electrolyte membrane. However, the increase in the contact area does not contribute to a proton bypass transport effect that is an effect by which protons are easily supplied to the entire catalyst layer by small electrical resistance.

For example, the area of the portion where the catalyst layer and the electrolyte membrane contact each other can be changed by: respectively setting a height (h) of the projection and a thickness of the catalyst layer to constant values; and variously changing a cross-sectional area ($\phi$) of the projection and a projection-projection interval 5 (S). However, even if the contact area is increased by this method, the electric power generation performance of the fuel cell is not significantly improved.

Next, the cross-sectional area ($\phi$) of the projection and the projection-projection interval (S) are respectively set to constant values, and the height (h) of the projection is variously changed. In this case, the performance of the fuel cell improves as the height (h) increases. In addition to the control of the height (h), the maximum thickness of the catalyst layer is set to be small, that is, to one to three times the height of the projection. This increases the degree of the performance improvement. In order to involve as much as possible of catalyst metal (such as Pt) contained in the catalyst layer in a fuel cell reaction, a case where the protons in the electrolyte membrane are delivered to the catalyst metal located away from the electrolyte membrane through a bypass portion of the electrolytes constituting the projections is more efficient than a case where the protons are delivered through a proton conduction path in the catalyst layer which has gotten into the depressions. Therefore, it is preferable that the maximum thickness of the catalyst layer be set to be thin, that is, to 30 μm or less. With this, the performance of the fuel cell is significantly improved. If the maximum thickness of the catalyst layer exceeds 30 μm, the adequate supply of the protons to the entire catalyst layer cannot be secured, and the cell performance is not adequately improved. In contrast, if the maximum thickness of the catalyst layer is too small, it becomes difficult to uniformly form the catalyst layer in a case where a common coating method, such as screen coating or spray coating, is used for the formation of the catalyst layer. On this account, the maximum thickness of the catalyst layer is practically set to 10 μm or more. In the present invention, the height (h) of the projection is set to 5 to 15 μm, and the maximum thickness of the catalyst layer is set to one to three times the height (h) of the projection. Practically, it is preferable that the maximum thickness of the catalyst layer be set to 10 to 30 μm. In this case, the maximum thickness of the catalyst layer is equal to or more than the height of the projection.

According to the present invention, the maximum thickness of the catalyst layer is adjusted to be thin. Therefore, the amount of catalysts used is small, and this is extremely advantageous in terms of the manufacturing cost of the fuel cell. That is, the present invention is extremely useful since the excellent current-voltage characteristics can be continuously achieved, and in addition, the manufacturing cost of the fuel cell can be suppressed. Further, since the maximum thickness of the catalyst layer is adjusted to be thin, the fuel cell can be reduced in size.

However, the excellent electric power generation performance cannot be achieved only by increasing the heights of the projections of the electrolyte membrane and reducing the thickness of the catalyst layer. In the present invention, since the height of the projection is comparatively large, generated water tends to condense and accumulate in the catalyst layer having gotten into the depressions each formed between the projections. Since the oxygen-containing gas is inhibited by this accumulated water, the oxygen-containing gas is unlikely to be supplied to the catalyst layer, and a problem of the performance deterioration with time during the electric power generation occurs. The larger the height of the projection is and the higher the current density at the time of the electric power generation becomes, the more significant the performance deterioration due to clogging by the generated water becomes.

In order that the performance improvement effect is achieved by the proton bypass transport effect of the projections on the electrolyte membrane, it is necessary to suppress the clogging of the depressions by the generated water. The clogging of the depressions by the generated water can be suppressed by the reduction in current density and the reduction in humidification of the oxygen-containing gas. In the case of the reduction in current density, the current density is adjusted to less than 0.5 A/cm$^2$. If the current density is 0.5 A/cm$^2$ or more, the suppression of the performance deterioration by the reduction in current density is inadequate.

The dry state or wet state of each of the catalyst layer and the electrolyte membrane is determined mainly by the relative humidity of the supply oxygen-containing gas at a cell operating temperature. The dry condition and wet condition of each of the catalyst layer and the electrolyte membrane are dominantly determined by not the temperature but the relative humidity to which the catalyst layer and the electrolyte membrane are subjected. Therefore, the relative humidity can represent the operating condition.

Here, the relative humidity of the oxygen-containing gas is reduced to be significantly lower than the relative humidity of the conventionally used oxygen-containing gas. Thus, the clogging of the depressions by the generated water is suppressed, and the performance deterioration with time can be avoided. Specifically, the performance deterioration with time can be avoided by using the oxygen-containing gas whose relative humidity is 10% or lower at the operating temperature of the fuel cell. In a case where the oxygen-containing gas having low relative humidity is used, and the current density is 0.5 A/cm$^2$ or more, the wet state of the electrolyte membrane can be maintained by the water generated in the catalyst layer located on the cathode side. Therefore, the cell performance does not deteriorate by excess drying of the electrolyte membrane, and this is preferable.

Therefore, according to the present invention, the fuel cell including: the electrolyte membrane having the cathode-side surface on which the projections having the heights of 5 to 15 µm are formed; and the cathode constituted by the catalyst layer having the maximum thickness which is one to three times the height of the projection is operated mainly by the supply of the oxygen-containing gas having the relative humidity of 10% or lower. With this, the proton bypass transport effect obtained by the formation of the projections and depressions on the surface of the electrolyte membrane can be adequately, stably achieved. Thus, the performance improvement, that is, the increase in voltage can be realized, and the performance deterioration with time can be avoided.

FIG. 1 shows the structure in which the shapes and sizes of respective projections are the same as one another and which has planar regularity. However, the regularity of the projections is not necessarily required to achieve the proton bypass transport effect. For example, the projections of various shapes may be provided, and the sizes of the projections and the projection-projection intervals may range or vary. In such case, the height of the projection is considered as an average value.

Figure 9:
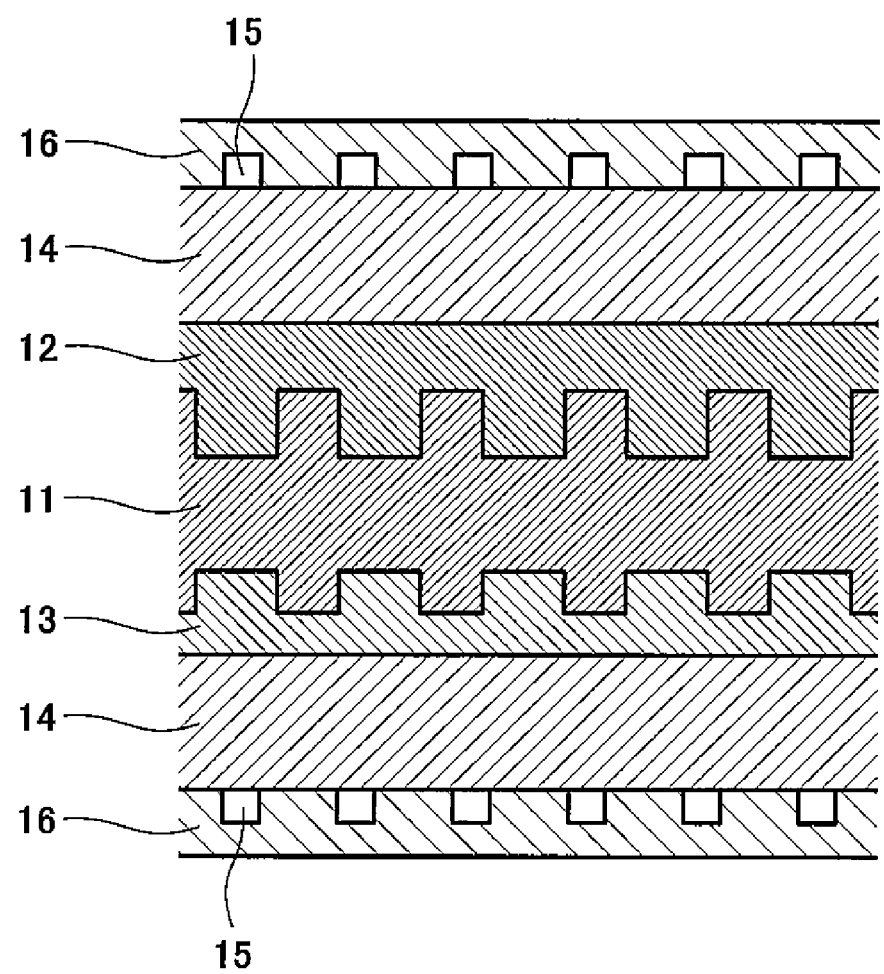
FIG. 9 is a cross-sectional conceptual diagram showing the configuration of a polymer electrolyte fuel cell used in the present invention.

FIG. 9 is a cross-sectional conceptual diagram showing the configuration of the polymer electrolyte fuel cell used in the present invention. A cathode catalyst layer 12 and an anode catalyst layer 13 are respectively provided on both surfaces of an electrolyte membrane 11. Gas diffusion layers 14 are respectively provided on the cathode catalyst layer 12 and the anode catalyst layer 13. Separators 16 each including a gas channel 15 are respectively provided on two gas diffusion layers. The depression-projection structures are respectively formed on both surfaces of the electrolyte membrane 11, and the cathode catalyst layer 12 and the anode catalyst layer 13 are formed to closely contact the depression-projection structures, respectively. For example, such catalyst layer can be formed by applying a coating liquid containing catalysts onto the electrolyte membrane on which the depression-projection structure is formed. The maximum thickness of the catalyst layer denotes a thickness from the surface of the catalyst layer up to a deepest portion (portion which contacts the depression of the electrolyte membrane) of the catalyst layer. FIG. 9 shows that the depression-projection structures are respectively formed on both surfaces of the electrolyte membrane 11. However, according to the present invention, it is essential that the depression-projection structure is formed on the surface on which the cathode catalyst layer 12 is formed. It is not necessarily required that the depression-projection structure is formed on the surface on which the anode catalyst layer 13 is formed.

During the operation of the fuel cell, the oxygen-containing gas is supplied to the cathode catalyst layer 12 through the cathode-side separator and diffusion layer, and the hydrogen gas is supplied to the anode catalyst layer 13 through the anode-side separator and diffusion layer.

Example 1

A projection type electrolyte membrane was produced by the casting of a fluoropolymer electrolyte solution by using a depression type mold. The depression type mold was produced by: forming various patterns on a silicon wafer by masks; and performing plasma etching. The cross-sectional shape of the projection and the projection-projection interval were adjusted by a mask pattern, and the height of the projection was adjusted by the time and intensity of the plasma etching. Used as the polymer electrolyte solution was a Nafion liquid (water/alcohol solvent, solid content ratio was adjusted to about 20%). The silicon wafer on which the projections of various shapes and the depressions of various shapes were formed was coated with the Nafion liquid and was then dried. When drying, the temperature and humidification conditions of the atmosphere were adjusted. According to need, the Nafion liquid coating and the drying were repeatedly performed plural times. After the drying, a heat treatment was performed at 130 to 200° C. in the air to prevent the Nafion from dissolving in water again. The time of the heat treatment was adjusted in a range from one minute to 100 minutes depending on the temperature of the heat treatment. The membrane having been subjected to the heat treatment was peeled off from the silicon mold by using a jig, such as tweezers, such that the depressions and the projections were not damaged. If it was difficult to peel off the membrane, the silicon mold was treated with a release agent in advance such that the membrane was easily released. In the projection type membrane, a standard shape of the projection was set to 5 μm in the cross-sectional diameter, 3 μm in the height (h), and 5 μm in the projection-projection interval (S). To examine the influence of the diameter of the projection, the height of the projection, and the projection-projection interval on the electric power generation performance, the projection type membranes in which an intended shape factor was fixed and other shape factors were variously changed were produced.

Next, a catalyst layer ink was prepared by: adding a Nafion solution (solid content ratio was 20%) that was an electrolyte binder to TEC10E50E (produced by Tanaka Kikinzoku Kogyo, ketjen carrier, the amount of Pt was about 45 weight %) that was Pt/C powder; and mixing them. The catalyst layer was formed by: coating the projection type electrolyte membrane with the catalyst layer ink by the screen coating; and drying the catalyst layer ink. The amount of coating was adjusted such that the loading amount of Pt catalysts became $0.5 \pm 0.05$ mg/cm$^2$. Used as the gas diffusion layer was a layer formed by: performing water repellent finish with respect to carbon paper having a thickness of 180 to 270 μm; and forming a microporous layer on the surface of the carbon paper. The microporous layer was formed by: kneading carbon powder and a fluorocarbon resin dispersing liquid; coating the carbon paper with the mixture; and performing the heat treatment with respect to the carbon paper. The obtained gas diffusion layers were stacked so as to sandwich the catalyst layers from the anode (fuel electrode) side and the cathode (air electrode) side such that the microporous layer was located on the catalyst layer side. The thickness of the catalyst layer was 15 μm.

Next, a small cell was produced for the performance evaluation of the catalyst layer. The shape of the catalyst layer was set to a 6-cm square. To secure a gas seal performance, a seal sheet whose thickness was adjusted was provided around the gas diffusion layer. Further, two separators each having a surface on which a serpentine gas channel was formed sandwiched the gas diffusion layers such that the surface including the serpentine gas channel contacted the gas diffusion layer, and then the configuration in which the gas seal performance and electric conductivity among respective members were secured was realized by fastening plates. Used as the separator was a composite type separator made of carbon powder and resin.

For comparison, a comparison small cell was produced, in which: the catalyst layer was formed on the surface of a flat electrolyte membrane made by casting such that the amount of Pt became 0.5 mg/cm$^2$ as above; and the other members including the gas diffusion layer were formed as above.

In the evaluation, a humidified hydrogen gas (utilization ratio was 70%) and a humidified oxygen gas (utilization ratio was 50%) were used as the reactant gases to be supplied to the small cell, and the cell operating temperature (electric power generating temperature) was set to 90° C. In the following experiment, the relative humidity (RH) of the supply gas was adjusted by basically fixing the cell operating temperature to 90° C. and adjusting the humidification dew point of each of the anode gas and the cathode gas (the humidification dew point was the temperature of hot water in which each of the anode gas and the cathode gas was immersed in a bubbler for humidification). The relative humidity can be easily calculated by the ratio of saturated steam pressure at a temperature T° C., represented by Formula 1 below.

Saturated steam pressure:$E(T)$[hPa]

Temperature:$T$[° C.]

$$E(T)=6.11\times10^{((7.5\times T)/(T+237.3))} \qquad \text{Formula 1}$$

TABLE 1

| | Cross-sectional diameter (φ) of projection (μm) | | |
|---|---|---|---|
| | 2 | 5 | 10 |
| Projection-projection interval (S) (μm) 2 | a | b | c |
| 5 | d | e | f |
| 10 | g | h | i |

The height (h) of the projection was fixed to 3 μm.

Figure 2:
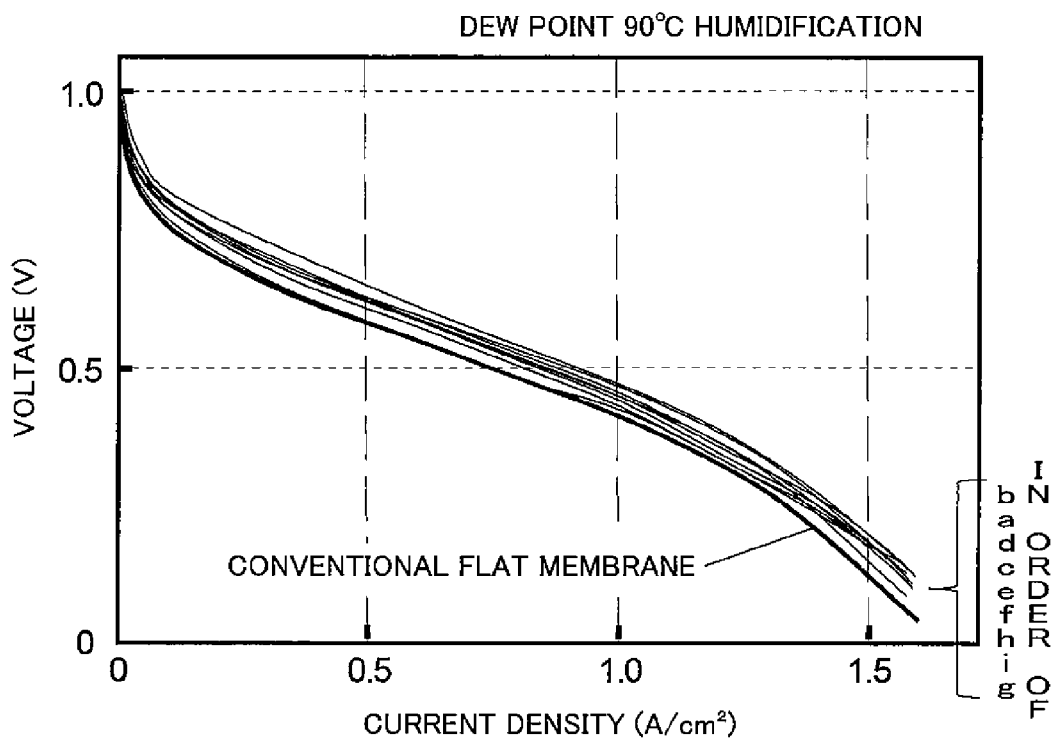
FIGS. 2A and 2B are diagrams showing current-voltage characteristics of MEAS in which a diameter (φ) of a projection and a projection-projection interval (S) are variously changed in Example 1.
Figure 2:
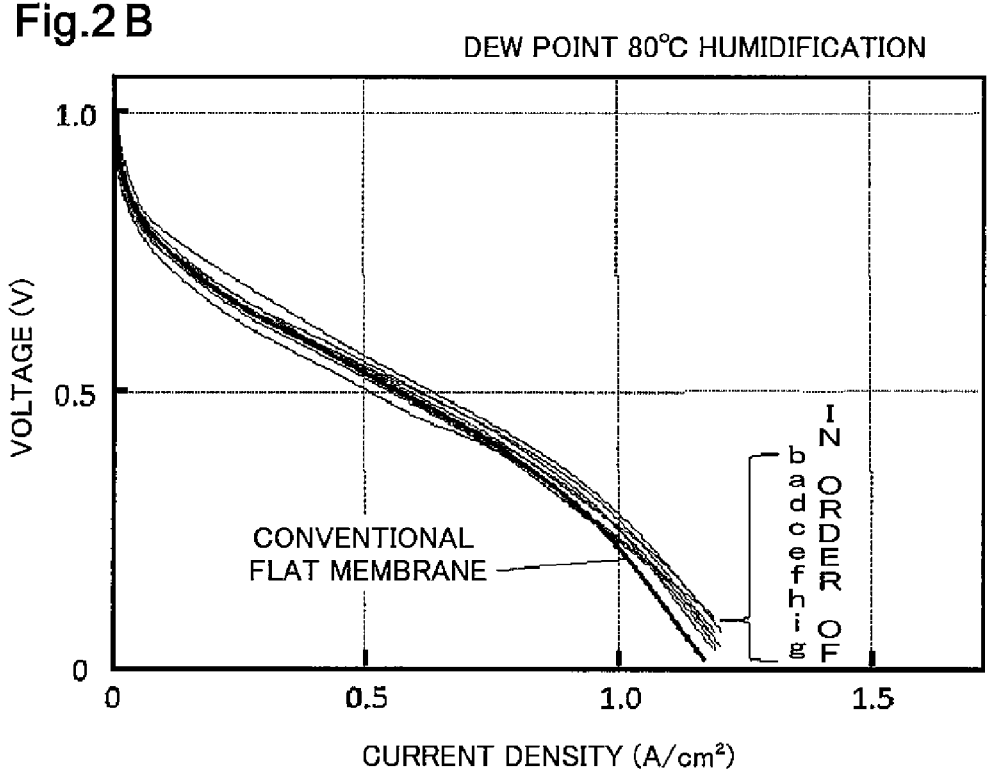

First, nine types of evaluation small cells were produced, in each of which: the height of the projection was fixed to 3 μm; as shown in Table 1, the diameter (φ) of the projection was set to 2, 5, or 10 μm; and the projection-projection interval (S) was set to 3, 5, or 10 μm. The humidification dew point of the supply gas was adjusted to 90° C. (RH=100%) or 80° C. (RH=67%). Thus, the current-voltage characteristics of these cells were evaluated. The comparison small cell including the conventional flat electrolyte membrane was also evaluated in the same manner as above. Results of the evaluations are shown in FIGS. 2A and 2B. FIGS. 2A and 2B show the current-voltage characteristics immediately after the start of the evaluation.

By the comparison between FIGS. 2A and 2B, it was found that when the humidification dew point of the supply gas decreased, the current-voltage characteristics also decreased as a whole. This may be because the electrolyte membrane dried by the decrease in humidity of the supply gas, and the proton conductivity decreased. However, it was found from FIGS. 2A and 2B that the change in the diameter (φ) of the projection and the change in the projection-projection interval (S) did not significantly affect on the current-voltage characteristics. To be specific, the output density improvement effect by the formation of the projections and depressions on the surface of the electrolyte membrane described in each of Japanese Laid-Open Patent Application Publication Nos. 2005-108822 and 2006-331720 and J. Am. Chem. Soc., Vol. 128, No. 39, 12971 (2006) was confirmed little.

Especially, in the evaluation small cell in which the diameter (φ) of the projection and the projection-projection interval (S) were minimum (φ: 2 μm, S: 2 μm), the surface area of the electrolyte membrane was equal to or more than twice the surface area of the flat membrane. However, the significant improvement of the characteristics was not observed. It was found from this result that regarding the characteristics improvement effect by the formation of the projections and depressions, the increase in the area of the portion where the catalyst layer contacted the electrolyte membrane was not a dominant factor. With this, it was found that the supply of the protons to the portion of the catalyst layer away from the electrolyte membrane was facilitated by the formation of the depressions and projections, that is, the proton bypass transport effect was important for the characteristics improvement.

Next, five types of evaluation small cells were produced, in each of which: the diameter (φ) of the projection was fixed to 5 μm; the projection-projection interval (S) was set to 5 μm; and the height of the projection was set to 1, 3, 5, 10, or 15 μm. The current-voltage characteristics of these evaluation small cells were evaluated in the same manner as above. These evaluations were performed continuously for five hours. Results of the evaluations are shown in FIGS. 3A, 3B, 4A, and 4B.

Figure 3:
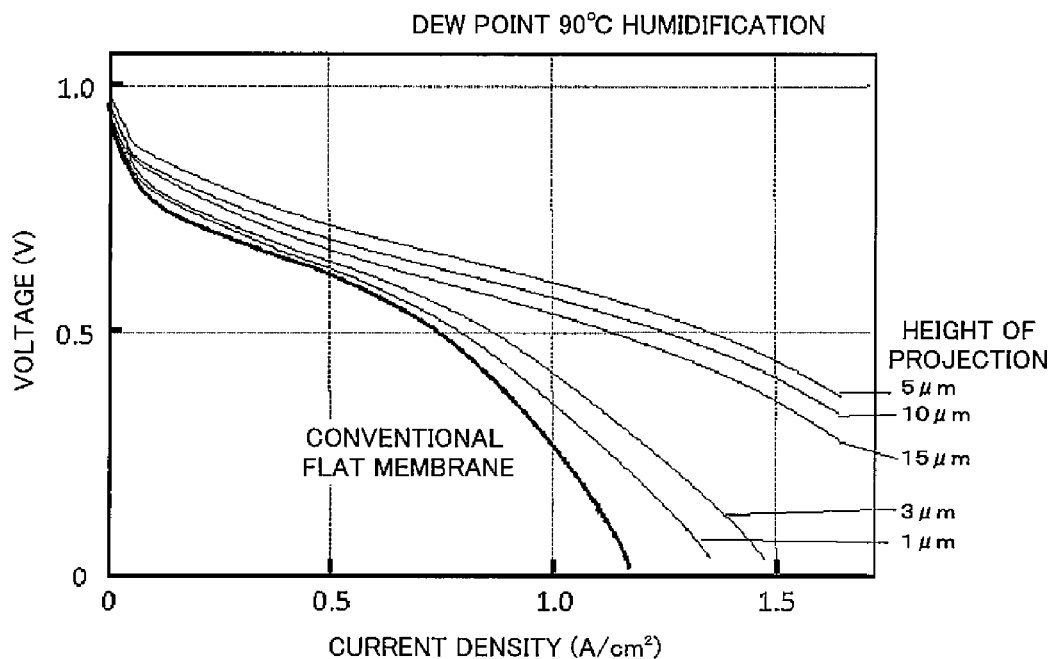
FIGS. 3A and 3B are diagrams showing the current-voltage characteristics of the MEAS in which the height of the projection is variously changed in Example 1, the current-voltage characteristics being obtained immediately after the start of the evaluation.
Figure 3:
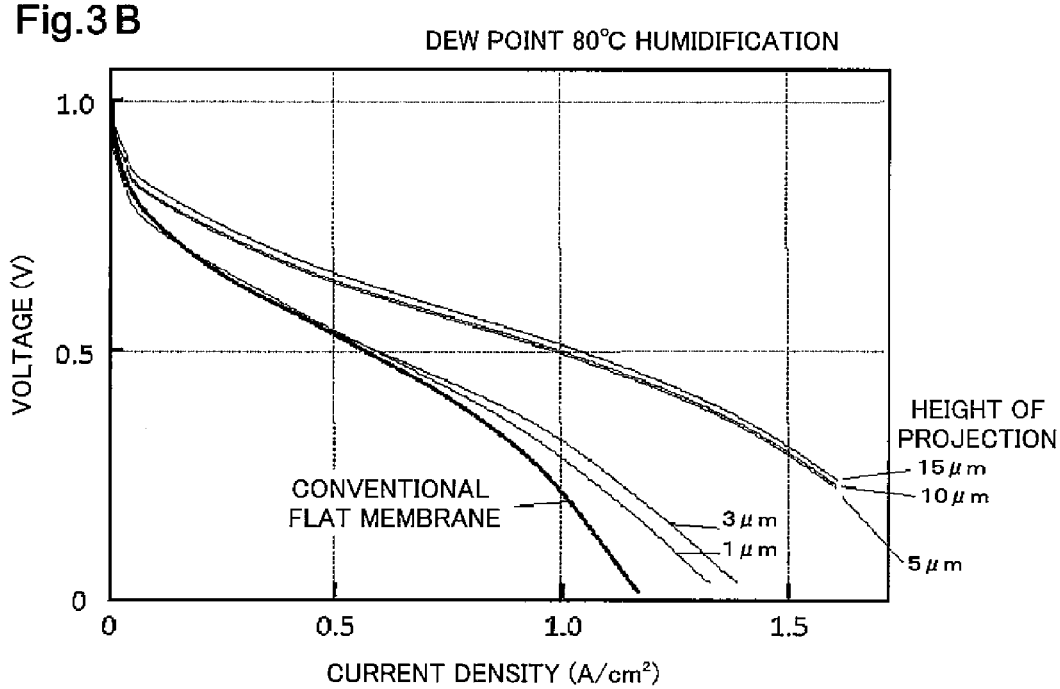

FIGS. 3A and 3B show the current-voltage characteristics immediately after the start of the evaluation. It was found from FIGS. 3A and 3B that: when the height of the projection was 1 or 3 μm, the current-voltage characteristics were improved little; but when the height of the projection was 5, 10, or 15 μm, the output voltage was improved at the same current density, the current density was significantly improved at the same output voltage, and the characteristics were significantly improved as compared to the characteristics of the conventional flat electrolyte membrane.

However, in FIG. 3A in which the relative humidity was 100%, the characteristics when the height of the projection was 10 or 15 μm tended to slightly deteriorate as compared to the characteristics when the height of the projection was 5 μm. In contrast, in FIG. 3B in which the relative humidity was 67%, such tendency was not observed.

Figure 4:
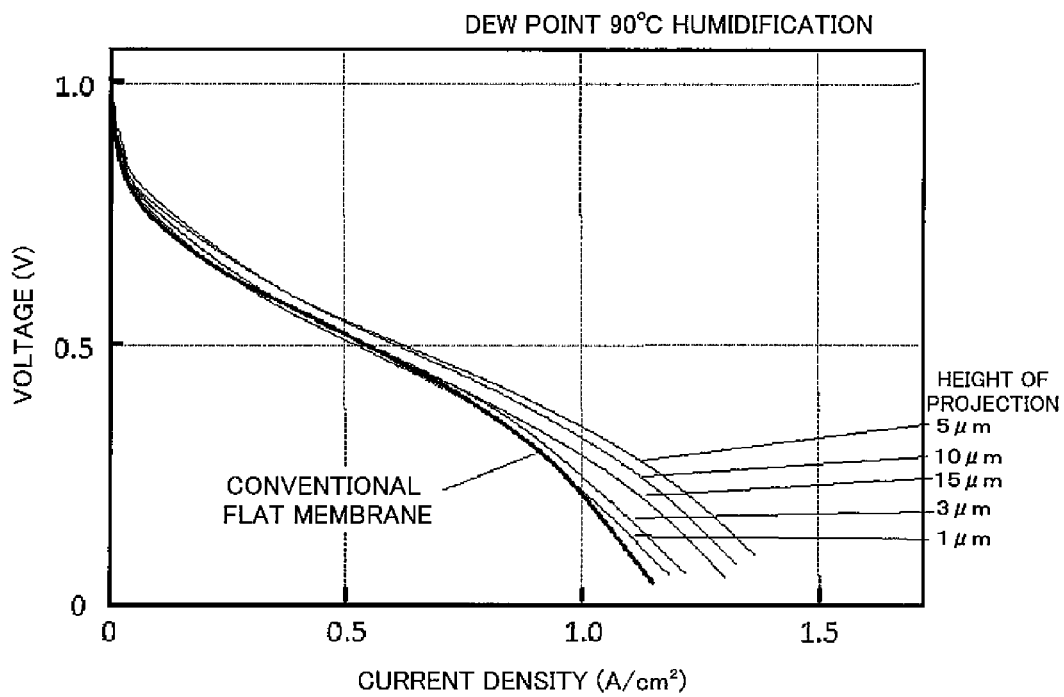
FIGS. 4A and 4B are diagrams showing the current-voltage characteristics of the MEAS in which the height of the projection is variously changed in Example 1, the current-voltage characteristics being obtained after five hours from the start of the evaluation.
Figure 4:
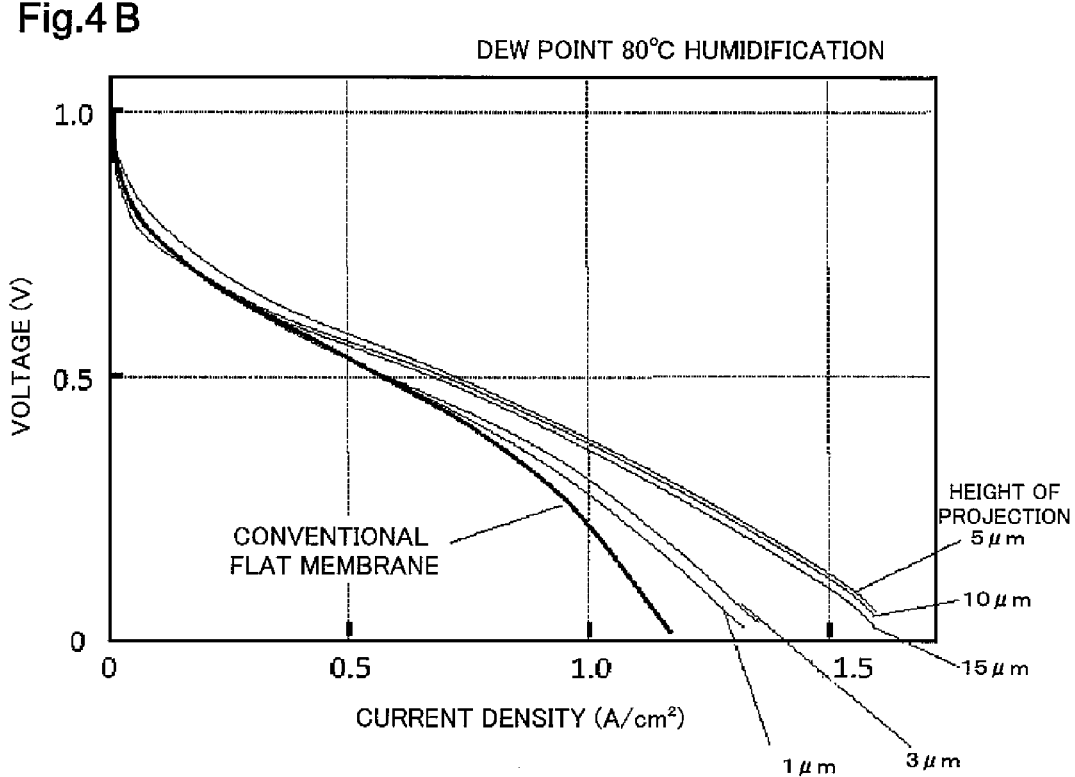

FIGS. 4A and 4B show the current-voltage characteristics after five hours from the start of the evaluation. It was found from the comparison between FIGS. 3A and 4A and the comparison between FIGS. 3B and 4B that when the height of the projection was 5 μm or more, the performance significantly deteriorated under any humidification condition in FIGS. 4A and 4B. To be specific, it was found that the performance deteriorated with time. However, the degree of the performance deterioration with time when the relative humidity was 67% (dew point: 80° C.) was smaller than that when the relative humidity was 100% (dew point: 90° C.). In contrast, regarding the comparison small cell using the conventional flat electrolyte membrane, such performance deterioration with time was observed little.

Figure 5A:
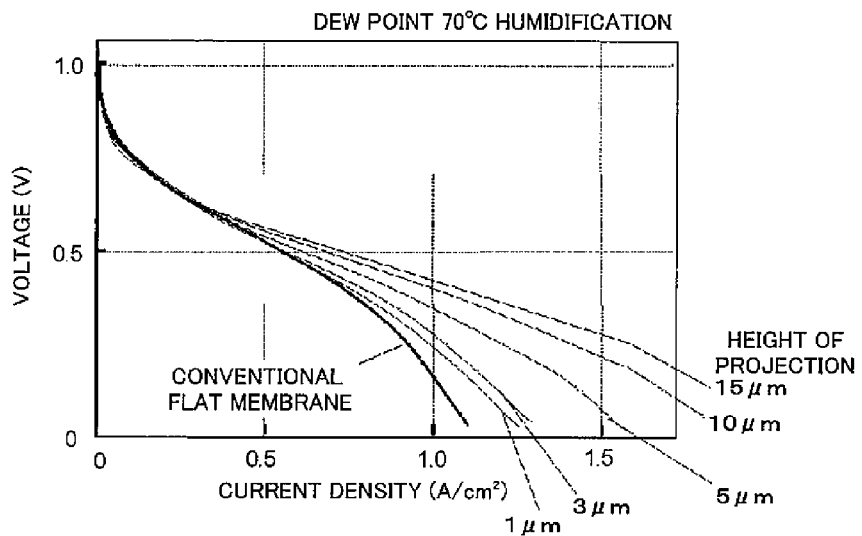
FIGS. 5A to 5C are diagrams showing the current-voltage characteristics of the MEAS in which the height of the projection is variously changed in Example 1, the current-voltage characteristics being obtained after five hours from the start of the evaluation.
Figure 5B:
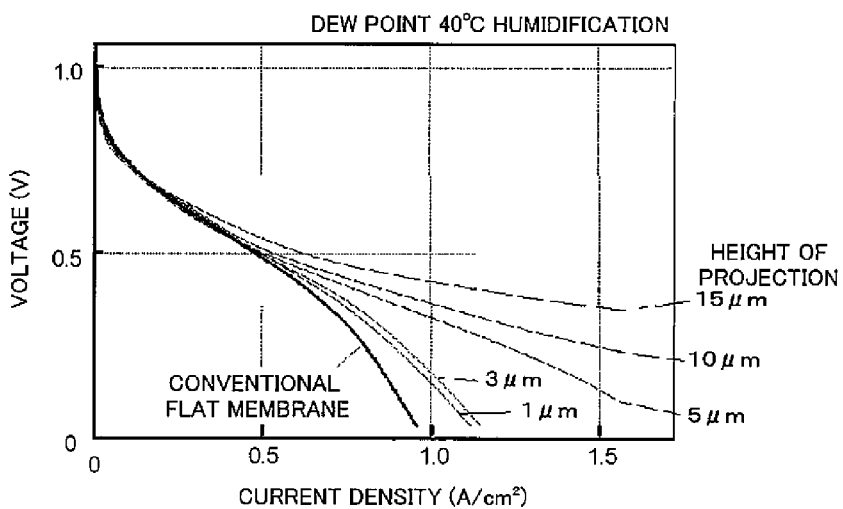

Next, regarding the small cells which gave the results shown in FIGS. 3A, 3B, 4A, and 4B, the current-voltage characteristics were evaluated in the same manner as above by using the supply gas whose humidification dew point was adjusted to 70° C. (RH=44%) or 40° C. (RH=10%). In this evaluation, there were no significant changes between the current-voltage characteristics immediately after the start of the evaluation and the current-voltage characteristics after five hours from the start of the evaluation. FIGS. 5A and 5B show the current-voltage characteristics after five hours from the start of the evaluation. It was found from this result that when each of these supply gases having the low relative humidity was introduced, the performance deterioration with time did not occur.

Figure 5C:
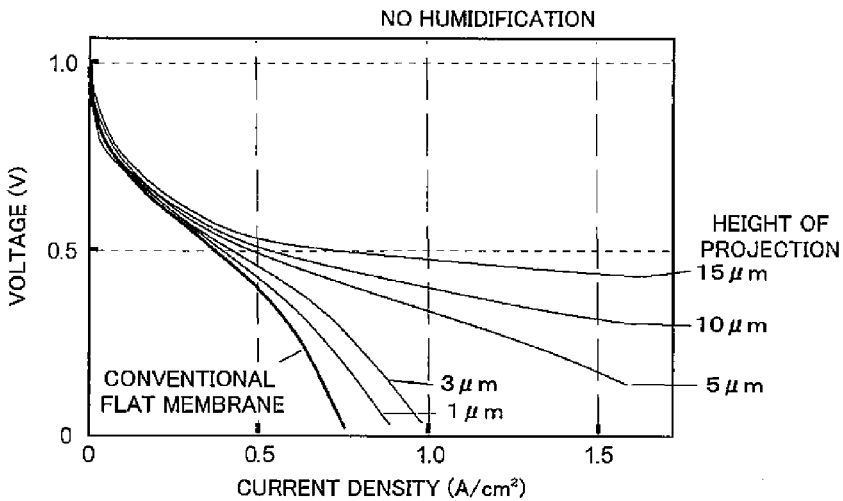

Next, the same performance evaluation as above was performed on the assumption of the operation not using a humidifier, such as a bubbler (practically, the operation called a non-humidification operation). Specifically, the same performance evaluation as above was performed by supplying ambient air at a room temperature of 30° C. and a humidity of 50% as the cathode gas. By supplying such ambient air to the fuel cell whose operating temperature was 90° C., the relative humidity of the supply gas became about 3%. Results are shown in FIG. 5C. It was found from FIG. 5C that even in such non-humidification operation, the high performance was maintained with time when the height of the projection was 5 μm or more, and in addition, the performance was higher than that when the relative humidity was 10% (FIG. 5B).

Figure 6:
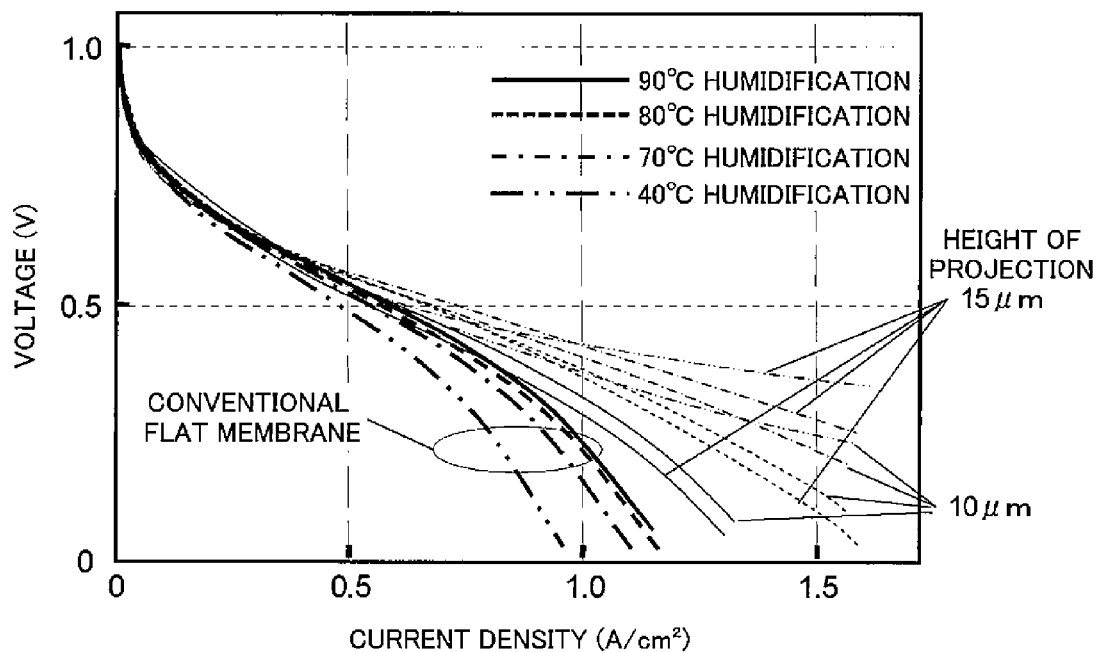
FIG. 6 is a diagram showing the current-voltage characteristics of the MEAS in which the height of the projection is 10 or 15 μm among the results shown in FIGS. 4A, 4B, 5A, and 5B, the current-voltage characteristics being obtained after five hours from the start of the evaluation.

FIG. 6 shows the current-voltage characteristics after five hours from the start of the evaluation under the above-described four humidification conditions when the height of the projection was 10 or 15 μm among the results shown in FIGS. 4A, 4B, 5A, and 5B. It was found from FIG. 6 that the performance was high in a low current density region under a high humidification condition but was high in a high current density region under a low humidification condition.

The shape of a current-voltage characteristic curve became a downwardly projecting shape when the humidification dew point of the supply gas was lower than 40° C. (the relative humidity was lower than 10%) whereas the shape of the current-voltage characteristic curve became an upwardly projecting shape when the humidification dew point of the supply gas was higher than 80° C. (the relative humidity was higher than 67%). Thus, it was newly found that the current-voltage characteristic curve significantly changed depending on the degree of humidification of the supply gas.

Further, it was found from FIGS. 5A, 5B, and 5C that in a case where the humidification dew point of the supply gas was lower than 70° C. (the relative humidity was lower than 44%), the performance when the height of the projection was 15 μm was higher than the performance when the height of the projection was 10 μm. It was newly found from this result that the performance improvement effect by the increase in the height of the projection became significant as the humidification of the supply gas decreases.

Such interesting relation among the height of the projection, the humidification condition of the operation, and the cell characteristics may be established since: the reactant gas was unlikely to reach the depression between the projections due to the increase in the height of the projection; and the water generated or condensed in the depressions was unlikely to be discharged. In a case where the height of the projection was 10 μm or more under the high humidification condition, the protons and the oxygen gas were supplied in a balanced manner, a region where the Pt catalysts effectively acted did not increase, and the performance did not improve due to the increase in the height of the projection (see FIGS. 3A and 3B). In a case where the operation is continuously performed under the high humidification condition, the generated water or the condensed water may be accumulated in the depressions, and only the catalysts in the vicinity of the tip ends of the projections may effectively act, so that the performance may deteriorate with time as in FIGS. 4A and 4B. Therefore, the high performance may be maintained by the operation under low humidification except for a transitional operation under high humidification and a certain time in which the performance deterioration falls within an allowable range.

Example 2

In Example 1, the current-voltage characteristics of the small cells each including the projection type electrolyte membrane were evaluated. In Example 2, the current-voltage characteristics of the small cells each including the depression type electrolyte membrane were evaluated. In this depression type electrolyte membrane, the diameter of the depression was set to 10 μm. A depression-depression interval, that is, a rib width was set to 5 μm that was the same as the diameter (φ) of the projection of the projection type membrane, and the depth of the depression was set to 10 or 15 μm that was the same as the height of the projection of the projection type membrane. The other components, such as the catalyst layer and the gas diffusion layer, were the same as those of the small cell including the projection type membrane in Example 1. Thus, the small cell was produced, and the current-voltage characteristics thereof were evaluated.

Figure 7:
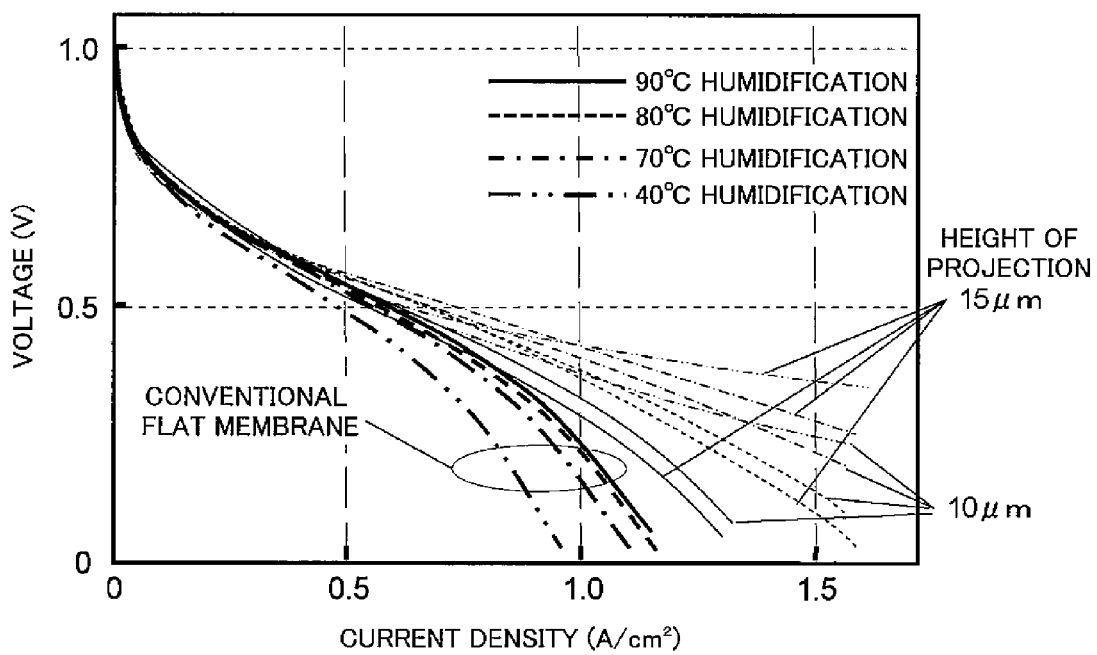
FIG. 7 is a diagram showing the current-voltage characteristics of the MEAS in which the height of the projection is 10 or 15 μm in Example 2, the current-voltage characteristics being obtained after five hours from the start of the evaluation.

FIG. 7 shows the current-voltage characteristics of a membrane electrode assembly after five hours from the start of the evaluation under various humidification conditions, the membrane electrode assembly using the depression type membrane in which the depth of the depression was 10 or 15 µm. FIG. 7 shows the same tendency as FIG. 6. That is, it was found that the depression type membrane showed the same current-voltage characteristics as the projection type membrane under each humidification condition.

Example 3

In Example 1, the improvement of the current-voltage characteristics was confirmed when the height of the projection was set to 5 µm or more. In Example 3, the relation between the thickness of a catalyst reaction layer and the current-voltage characteristics was evaluated. In Example 3, the same evaluation small cells as Example 1 were produced, in each of which in the projection type membrane, the diameter ($\phi$) of the projection was fixed to 5 µm, the projection-projection interval (S) was fixed to 5 µm, the height (h) of the projection was fixed to 10 µm, and the thickness of the catalyst layer was set to 10, 20, 30, 50, 100, or 150 µm. Regardless of the thickness of the catalyst layer, used as the catalyst layer ink for the formation of the catalyst layer was the same as that of Example 1. For example, when the thickness of the catalyst layer was 10, 50, and 100 µm, the loading amount of Pt was respectively about 0.25, 1.25, and 2.5 mg/cm$^2$. As a coating method of the catalyst layer, an optimal method was selected from screen coating, spray coating, and a transfer method depending on the thickness of the catalyst layer.

Figure 8:
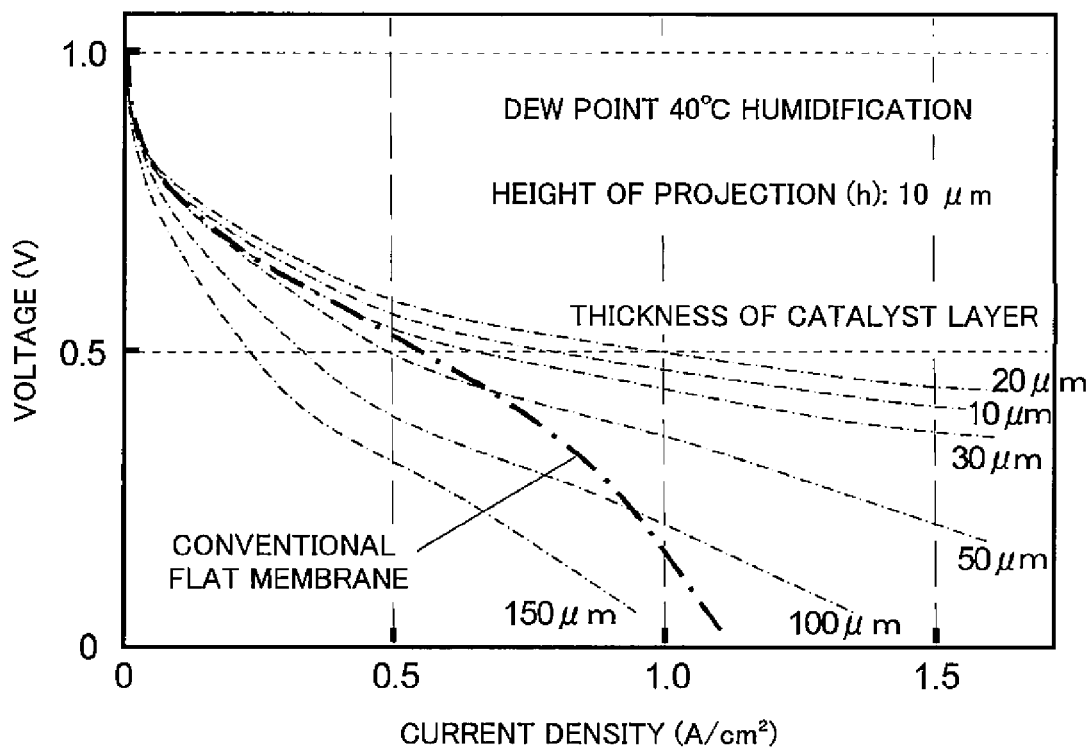
FIG. 8 is a diagram showing the current-voltage characteristics of MEAS in which the thickness of a catalyst layer is variously changed in Example 3, the current-voltage characteristics being obtained after five hours from the start of the evaluation under a low humidification condition in which the humidification dew point of the supply gas is 40° C. (relative humidity is about 10%).

FIG. 8 shows the current-voltage characteristics when the cells including the catalyst layers of various thicknesses were operated for five hours at the operating temperature of 90° C. under the low humidification condition in which the humidification dew point of the supply gas was 40° C. (relative humidity=about 10%). The performance of the MEA in which the thickness of the catalyst layer was 10 to 30 µm was higher than the performance of the MEA using the conventional flat membrane. However, the performance of the MEA in which the thickness of the catalyst layer was 50 µm or more was lower than the performance of the MEA using the conventional flat membrane. This may be because when the thickness of the catalyst layer increased, a reaction promoting effect by the proton bypass transport effect through the electrolyte of the projections was unlikely to reach the entire catalyst layer, and the reactant gases were unlikely to reach the catalyst layer in the vicinity of the projections.

According to the electric power generating method of the polymer electrolyte fuel cell of the present invention, the output density can be significantly increased, and the size and cost of the polymer electrolyte fuel cell can be significantly reduced. As a result, the market acceptability of stationary fuel cells and transportation fuel cells dramatically improves. In addition, the $CO_2$ emission can be suppressed, and the global environment load can be reduced.

What is claimed is:

1. A method of generating electric power using a polymer electrolyte fuel cell, comprising:
    step (A) of preparing the polymer electrolyte fuel cell,
        wherein the polymer electrolyte fuel cell includes a cathode, an anode, and an electrolyte membrane sandwiched between the cathode and the anode,
        wherein a plurality of projections each having a height of 5 to 15 µm or a plurality of depressions each having a depth of 5 to 15 µM were formed on a surface of the electrolyte membrane, the surface being opposed to the cathode, and
        wherein the cathode is constituted by a catalyst layer formed to tightly contact the surface of the electrolyte membrane, a thickness of the catalyst layer is one to three times the height of the projection or the depth of the depression, and a maximum thickness of the catalyst layer is 10 to 30 µm; and
    step (B) of supplying an oxygen-containing gas having a relative humidity of 10% or less to the cathode to generate the electric power by using the polymer electrolyte fuel cell.

* * * * *